(12) United States Patent
Challapalli

(10) Patent No.: US 9,268,832 B1
(45) Date of Patent: Feb. 23, 2016

(54) SORTING A DATA SET BY USING A LIMITED AMOUNT OF MEMORY IN A PROCESSING SYSTEM

(75) Inventor: Venkata Vijay Chaitanya Challapalli, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 1089 days.

(21) Appl. No.: 12/782,619

(22) Filed: May 18, 2010

(51) Int. Cl.
*G06F 17/30* (2006.01)

(52) U.S. Cl.
CPC ................................. *G06F 17/30575* (2013.01)

(58) Field of Classification Search
USPC .......................................... 707/1/1, 692, 713
See application file for complete search history.

(56) References Cited

U.S. PATENT DOCUMENTS

| 5,524,257 | A | * | 6/1996 | Koike et al. ..................... 706/10 |
| 5,802,357 | A | * | 9/1998 | Li et al. | |
| 5,845,113 | A | * | 12/1998 | Swami et al. | |
| 6,381,601 | B1 | * | 4/2002 | Fujiwara et al. .............. 707/692 |
| 6,732,124 | B1 | * | 5/2004 | Koseki et al. | |
| 6,917,947 | B2 | * | 7/2005 | Jameson | |
| 7,908,264 | B2 | * | 3/2011 | Bohannon et al. ............ 707/713 |
| 2009/0305680 | A1 | * | 12/2009 | Swift et al. ................. 455/414.1 |
| 2012/0095787 | A1 | * | 4/2012 | Davis et al. ...................... 705/4 |

* cited by examiner

*Primary Examiner* — Jeffrey A Burke
*Assistant Examiner* — Thong Vu
(74) *Attorney, Agent, or Firm* — Gilliam IP PLLC

(57) ABSTRACT

An efficient and highly scalable method of sorting an input file in a processing system by using only a limited amount (i.e., a portion) of memory in the processing system, where that amount of memory is substantially smaller than the input file, is disclosed. The input file can be, for example, a fingerprint database for use in deduplication, and the processing system can be, for example, a network storage server. The merge phase is broken down into sub-phases, where each sub-phase takes a predetermined number of subsets of a fingerprint file to merge and writes them back as a sorted, merged group. The number of threads used to process these groups can depend on the number of central processing units (CPUs) present in the system and can be dynamically tuned to achieve desired level of performance.

32 Claims, 8 Drawing Sheets

SORTING A DATA SET BY USING A LIMITED AMOUNT OF MEMORY IN A PROCESSING SYSTEM

FIELD OF THE INVENTION

At least one embodiment of the present invention pertains to a technique for sorting data, and more particularly, to a technique for sorting a data set, such as a deduplication fingerprint database, in a processing system, such as a network storage server, by using a limited amount of memory in the processing system.

BACKGROUND

Network storage is a common approach for making large amounts of data accessible to many users and/or for backing up data. In a network storage environment, a storage server makes data available to client systems by presenting or exporting to the clients one or more logical containers of data. There are various known forms of network storage, including network attached storage (NAS) and storage area networks (SANs). In a NAS context, a storage server services file-level requests from clients, whereas in a SAN context a storage server services block-level requests. Some storage servers are capable of servicing both file-level requests and block-level requests.

In a large-scale storage system, such as an enterprise storage network, it is common for some data to be duplicated and stored in multiple places in the system. Sometimes data duplication is intentional and desirable, as in the case of data mirroring, for example. Often, however, data duplication is an incidental byproduct of normal operation of the storage system. For example, a given sequence of data may be part of two or more different files, LUNS, etc. Consequently, it is frequently the case that two or more segments of data stored at different locations in a storage server are identical. Unintentional data duplication generally is not desirable because storage of the same data in multiple places consumes additional storage space, which is a limited resource.

Consequently, in many large-scale storage systems, storage servers have the ability to "deduplicate" data. Deduplication is a well-known method for increasing the capacity of a storage device or system by replacing multiple copies of identical sequences of data with a single copy, together with a much smaller amount of metadata that allows the reconstruction on demand of the original duplicate data. Techniques for deduplicating data within a network storage server are known and in commercial use today.

Deduplication tends to be a very resource-intensive process, especially when the amount of data to be deduplicated is large. To understand why this is so, first consider how deduplication is commonly performed. Initially, duplicate data segments are identified; this phase is called duplicate detection. A conventional method involves using a hash function, such as SHA-1, to compute an integer, called a "fingerprint", from each data segment, such that different data segments are extremely unlikely to produce the same fingerprint. The fingerprints are stored in one or more fingerprint files, e.g., one fingerprint file for each data volume maintained by the system.

The stored fingerprints are subsequently used to detect potential duplicate data segments. Duplicate detection may be done, for example, when a new data segment is about to be written, or it may be done as a background process. If two data segments have the same fingerprint, there is a high probability they are identical. Accordingly, when two data fingerprints are determined to be identical, the underlying data segments are compared byte by byte to determine if they are in fact identical. If the data segments are identical, deduplication is performed on them.

When the amount of data maintained by the storage system is large, such as in an enterprise-scale network storage system, even the fingerprint files can become extremely large, e.g., potentially hundreds of gigabytes each. Consequently, locating fingerprints in these files for purposes of duplicate detection and removal would be very inefficient and take a long time unless the fingerprint files are first sorted. With current techniques, however, the sorting process itself is extremely memory-intensive; yet often only a small portion of working memory of the system is made available for deduplication, since it is usually desirable to keep most space in memory available for servicing user requests. Also, a fingerprint file is typically much larger than the amount of available working memory in the system. Consequently, each fingerprint file is broken up into smaller chunks that are sorted separately, one at a time, and then merged back together. This process can take an inordinately long time, especially if there are multiple fingerprint files to be sorted; with conventional techniques the sorting process alone can take hours for an enterprise-scale storage system. The overall performance of the deduplication process therefore drops drastically as the amount of data to be deduplicated (and hence the size and number of fingerprint files) increases.

As a result, in conventional network storage systems the fingerprint sorting process (and therefore the overall deduplication process) is not very scalable relative to the amount of data maintained by the storage system. This problem hinders the goal of supporting customers' demands for storage servers that can handle and efficiently deduplicate data sets of ever-increasing sizes.

SUMMARY

The technique introduced here includes an efficient and highly scalable method of sorting an input file in a processing system by using only a limited amount (i.e., a portion) of memory in the processing system, where that amount of memory is substantially smaller than the input file. The input file can be, for example, a fingerprint database for use in deduplication, and the processing system can be, for example, a network storage server. A "file", as the term is used herein, is any logical container of data, regardless of whether or not it is called a file, and regardless of whether it is accessed using a so-called file-based protocol, block based protocol, or other type of protocol.

In one embodiment, a method according to the technique introduced here is as follows. First, the method creates and sorts a plurality of temporary files, each of which includes the contents of a different subset of an input file. The input file can be, for example, a data fingerprint file. The method then defines a plurality of groups from the plurality of temporary files. Each group includes the contents of two or more of the temporary files. The method then selects two or more of the groups and sorts, separately but concurrently, in memory of a processing system, the contents of each of the selected groups. In doing so, the method uses a separate execution thread to sort each selected group and uses only a portion of the memory, smaller than the input file, to do the sorting. The method then merges the sorted contents of the selected groups into a single file. The number of execution threads that run concurrently in this process can be equal to the number of CPUs in the processing system.

Other aspects of the technique and its advantages will be apparent from the accompanying figures and detailed description below. This summary is provided to introduce in a simplified form a selection of concepts that are further described in the accompanying detailed description and drawings. It is not intended to identify essential features of the claimed subject matter or to limit the scope of the claimed subject matter.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

In a conventional approach to sorting deduplication fingerprints, as described further below, there is an initial sorting phase in which separate subsets of the input file are individually sorted, followed by a merge-sort phase in which the sorted subsets are further sorted and merged. In the technique introduced here, the merge-sort phase is broken down into sub-phases, where each sub-phase takes a much smaller number of fingerprint files to merge-sort and writes them back as a sorted, merged group. A separate execution thread can be used to sort each group. The number of execution threads that sort concurrently can depend on the number of central processing units (CPUs) present in the system and can be dynamically tuned to achieve desired level of performance.

One effect of the technique introduced here is to reduce the number of entries (records) that need to be compared with each other during the merge-sort phase, which can substantially reduce the overall time required to complete the merge-sort. Another effect is to reduce the latency attributable to reading records from persistent storage, by increasing the number of records read into memory from each temporary file at a time. Further details in this regard are discussed below.

Figure 1:
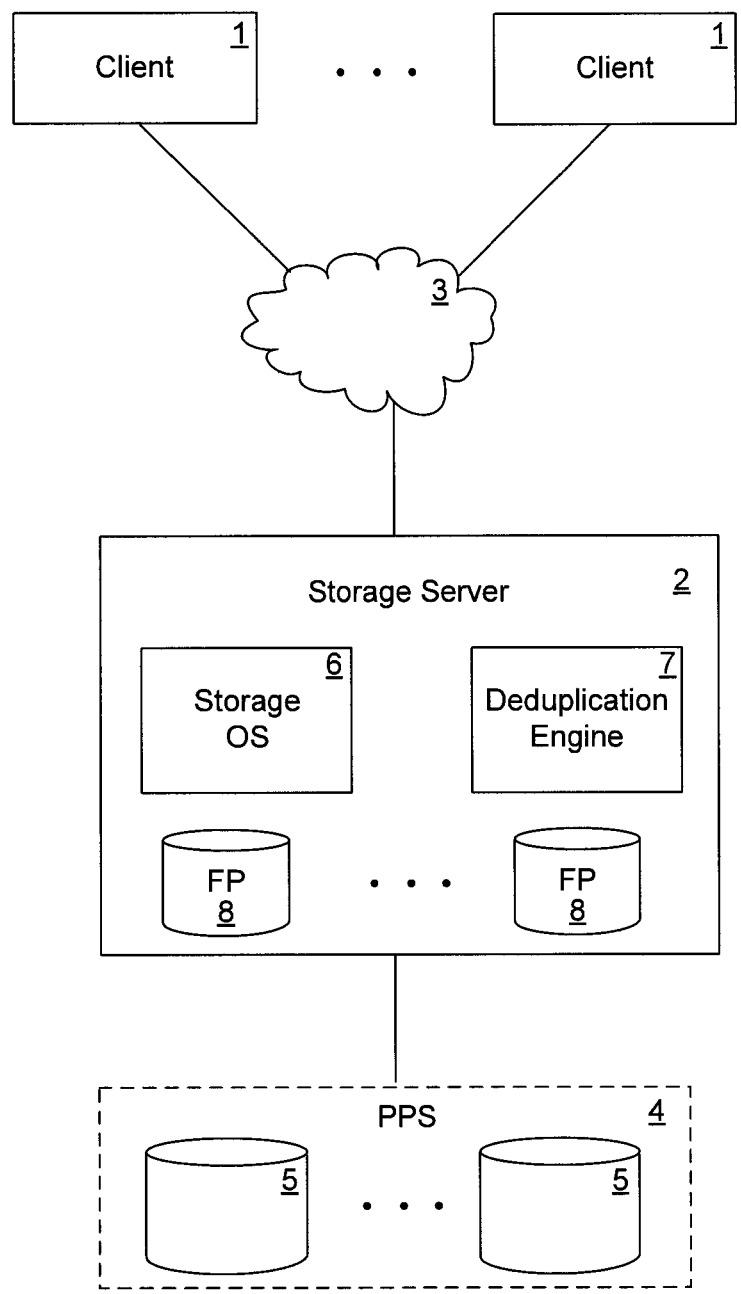
FIG. 1 illustrates a network storage environment in which the technique introduced here can be implemented.

FIG. 1 shows a network storage system in which the technique introduced here can be implemented. In FIG. 1, a storage server 2 is coupled to a primary persistent storage (PPS) subsystem 4 that includes multiple non-volatile mass storage devices 5, and to a set of clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the PPS subsystem 4 is managed by the storage server 2. The storage server 2 receives and responds to various read and write requests from the clients 1, directed to data stored in or to be stored in the storage subsystem 4. The mass storage devices 5 in the PPS subsystem 4 can be, for example, conventional magnetic or optical disks or tape drives; alternatively, they can be non-volatile solid-state memory, such as flash memory or solid-state drives (SSDs). The mass storage devices 5 can be organized as a Redundant Array of Inexpensive Disks/Devices (RAID), in which case the storage server 2 accesses the storage subsystem 4 using one or more well-known RAID protocols.

Further, in accordance with the techniques introduced here, the storage server 2 includes a storage operating system and deduplication engine, and one or more fingerprint (FP) files. The storage operating system is a functional module which controls most of the operations of the storage server two, including servicing client initiated data access requests. The deduplication engine performs deduplication, by using fingerprints stored in the fingerprint files for duplicate detection. In certain embodiments the deduplication engine may be a component of the storage operating system.

In one embodiment, each fingerprint file contains multiple entries or records, where each entry or record includes a fingerprint value, an inode number and a file block number (FBN). The fingerprint value is the actual fingerprint. The inode number is the number of the inode of the data file which contains the data segment which the fingerprint represents. An inode in this context is a container of metadata about a file, such as filename, size, ownership, permissions, etc. The FBN is the number of the logical block (i.e., the logical position) of the data segment within the file identified by the inode number.

The storage server 2 may be a file-level server such as used in a NAS environment, a block-level storage server such as used in a SAN environment, or a storage server which is capable of providing both file-level and block-level data access. Further, although the storage server 2 is illustrated as a single unit in FIG. 1, it can have a distributed architecture. For example, the storage server 2 can include a physically separate network module (e.g., "N-blade") and disk module (e.g., "D-blade") (not shown), which communicate with each other over an external interconnect.

Figure 2:
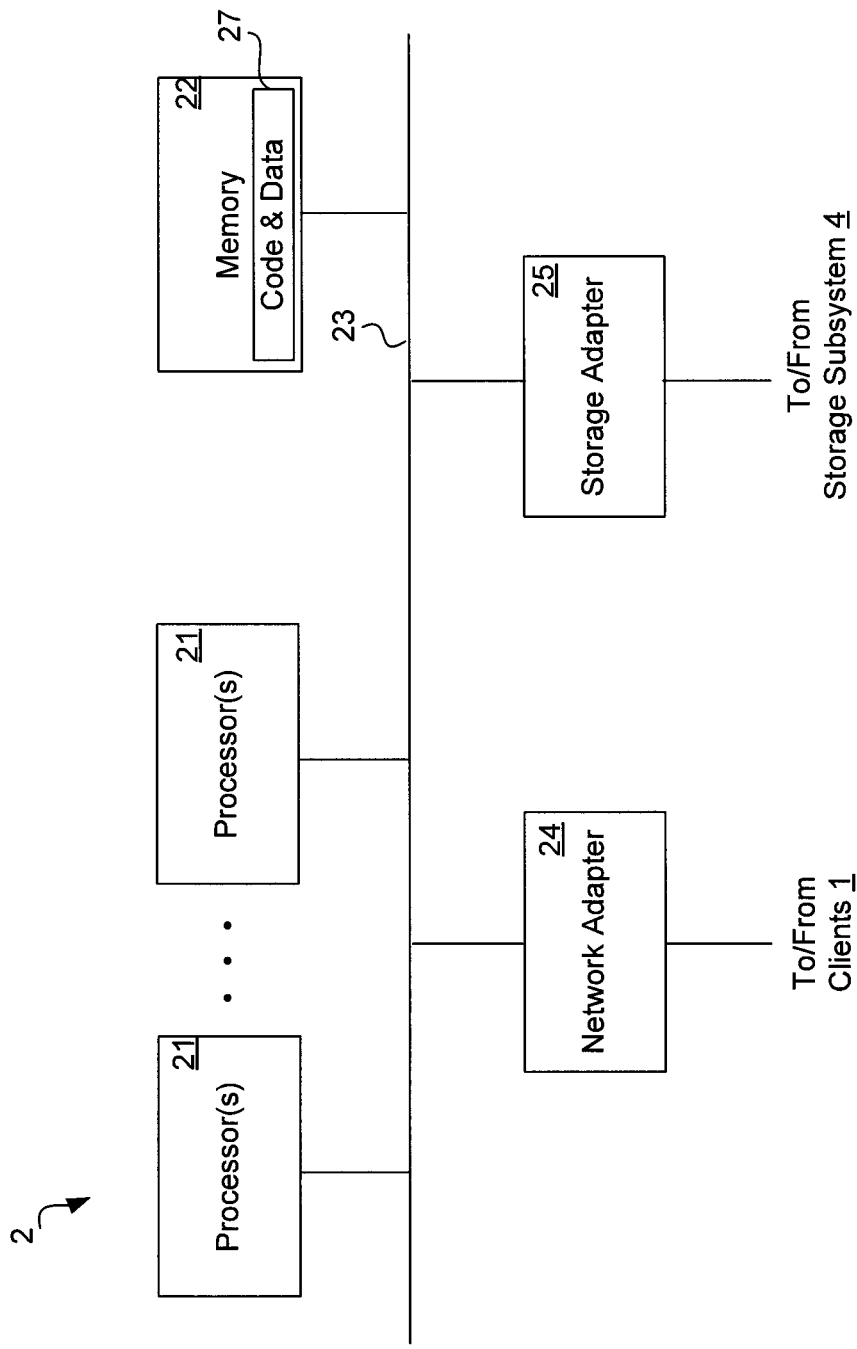
FIG. 2 is a high-level block diagram showing an example of the overall architecture of a storage server.

FIG. 2 is a high-level block diagram showing an example of the architecture of a storage server 2. The storage server 2 in the illustrated embodiment includes multiple processors 21 and memory 22, each coupled to an interconnect 23. The interconnect 23 is an abstraction that represents any one or more separate physical buses, point-to-point connections, or both connected by appropriate bridges, adapters, or controllers. The interconnect 23, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processors 21 may be or include the CPUs of the storage server 2 and, thus, control the overall operation of the storage server 2. In certain embodiments, the processor(s) 21 accomplish this by executing software or firmware stored in memory, such as memory 22. Each of the processors 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 22 is or includes the main memory (working memory) of the storage server 2. The memory 22 represents any form of random access memory (RAM), read-only memory (ROM), flash memory (as discussed above), or the like, or a combination of such devices. In use, the memory 22 may contain, among other things, software and/or firmware code and data 27 for use in implementing the storage operating system and/or the deduplication engine, including the sorting technique introduced below.

Also connected to the processors 21 through the interconnect 23 are a network adapter 24 and a storage adapter 25. The network adapter 24 provides the storage server 2 with the ability to communicate with remote devices, such as clients 1, over the interconnect 3 and may be, for example, an Ethernet adapter or Fibre Channel adapter. The storage adapter 25 allows the storage server 2 to access the PPS subsystem 4 and may be, for example, a Fibre Channel adapter or a SCSI adapter.

Figure 3:
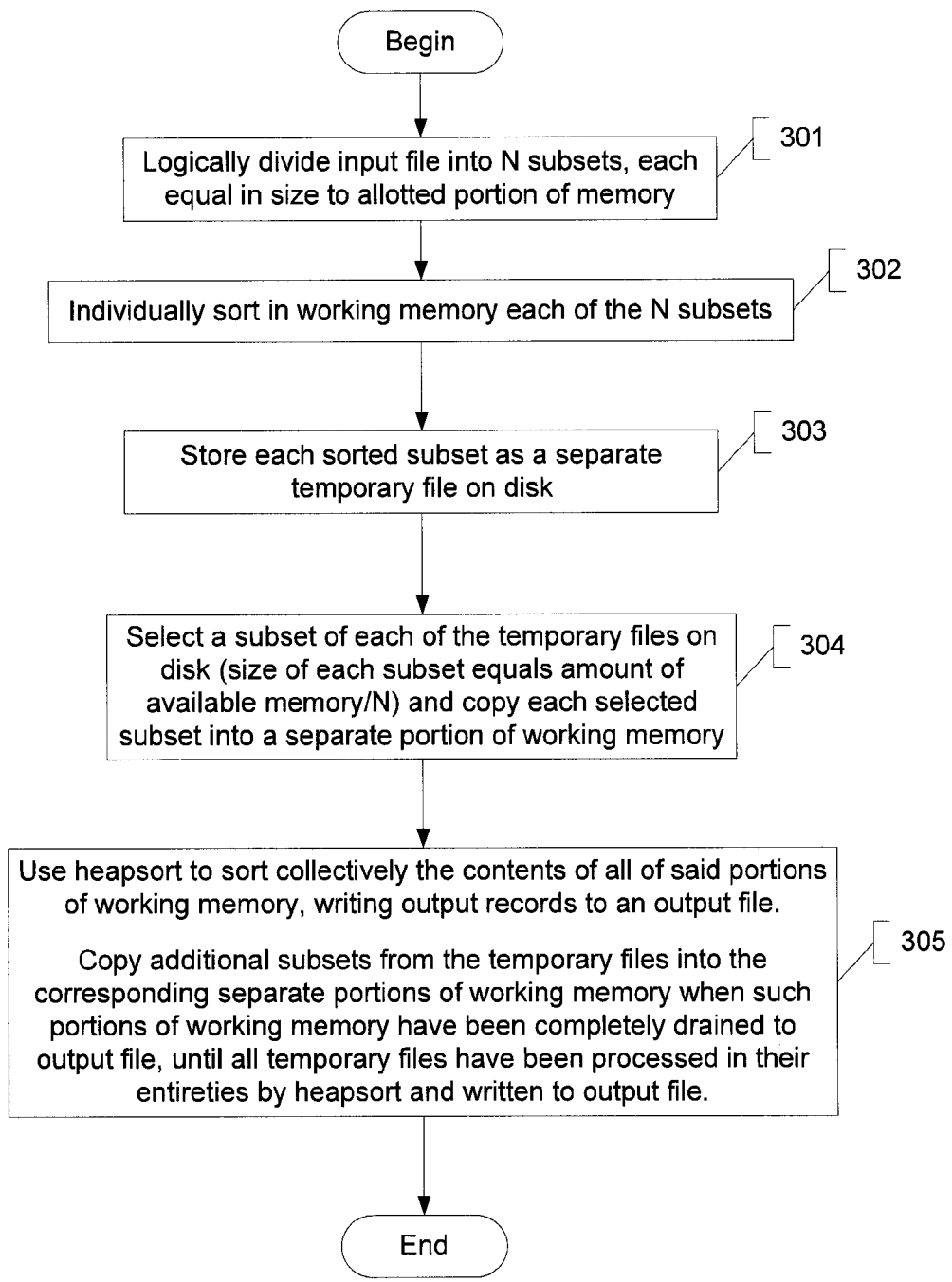
FIG. 3 is a flow diagram illustrating a prior art process for sorting a fingerprint file in a network storage system.
Figure 4:
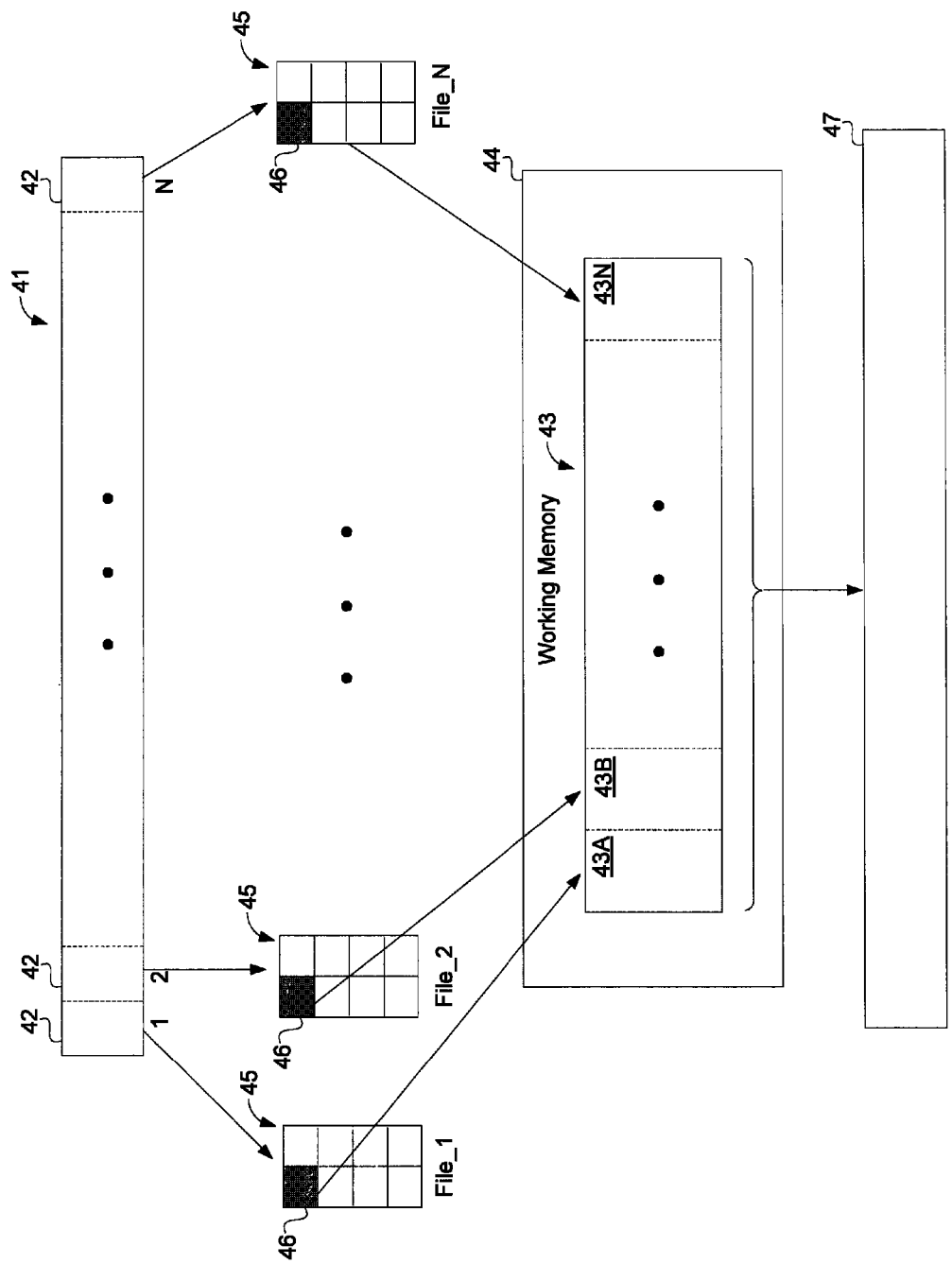
FIG. 4 schematically illustrates the process of FIG. 3.

In order to better understand the technique introduced here and its advantages, it is useful first to consider a prior art sorting process used by a storage server in data deduplication. Such a process is illustrated in FIGS. 3 and 4. FIG. 3 illustrates the process flow, while FIG. 4 illustrates the different data structures that are involved.

In the prior art method described here, a limited amount of working memory of the storage server is made available to the deduplication process, including the sorting of fingerprint files. For example, in one approach only 8 MB of working memory are made available for deduplication out of, for example, at least several GB of total working memory in the storage server. In contrast, a single fingerprint file (of which there may be many in a given storage system) may be on the order of 256 GB, for example. The significance of these numbers will become more apparent when this approach is compared with the technique being introduced here, as discussed below.

Initially, at 301 the method of FIGS. 3 and 4 logically divides a fingerprint file 41 (hereinafter "input file") into N contiguous subsets 42 of equal size, where N is an integer greater than one representing the number of subsets 42, such that the size of each subset is equal to the amount of available memory space 43 in working memory 44 for deduplication. It is assumed that the amount of available memory space 43 for deduplication is much less than the total size of working memory 44 and is configured in advance, i.e., prior to initiating deduplication. Continuing the example introduced above, given a 256 GB input file, the input file 41 is divided into 32,768 contiguous subsets (N=32,768) of 8 MB each.

Next, at 302 the method individually sorts each of the N subsets 42 in working memory 43. In certain implementations, the well-known quicksort algorithm is used to sort each subset 42.

At 303 the method stores each of those sorted subsets 42 as a separate temporary file 45 in persistent storage, e.g., on disk. In FIG. 4, for example, the process creates N temporary files 45, named File_1, File_2, . . . , File_N. Next, at 304 the method selects a subset 46 of each of the N temporary files 45 and copies them into separate logical partitions 43A, 43B, etc. of the available memory space 43. The selected subsets 46 are all of equal size, and that size is equal to the total amount of available working memory divided by N. If, for example, there is a total of 8 MB of available memory and there are 32,768 temporary files 45 (N=32,768), the size of each subset 46 would be 256 bytes (8 MB/32,768). Also, assuming for example each fingerprint record is 32 bytes, this means that each subset would include eight (8) fingerprint records (=256/32).

Next, at 305 the method sorts collectively, using the heapsort algorithm, all of the contents of all of the partitions 43A, 43B, etc. of available memory space 43, to produce a single sorted output file 47 on disk, which contains the merged, sorted contents of the N temporary files 45. The heapsort algorithm is well-known in the art and is therefore not described herein. More specifically, this step finds the lowest valued fingerprint in working memory 43 at any given instant and writes that record to the output file 47, and keeps repeating this operation until any of the partitions 43A, 43B, etc. has been completely "drained", i.e., until all of a partition's fingerprint entries have been written to the output file 47. At that time, the next subset (if any) from the corresponding temporary file 45 is the copied into that partition in memory 44. This sequence then continues until all temporary files have been processed in their entireties by the heapsort and written to output file 47 in this manner.

Once all of these steps have been completed, the resulting output file 47 is the sorted version of the input file 41. Importantly, the method of FIGS. 3 and 4 uses only a single execution thread to sort all of the contents of the available memory space 43.

The method of FIGS. 3 and 4 is not very scalable as the size of the input file grows, because the method uses only a single execution thread to sort all of the contents of the available memory space 43. The sort-merge phase 305 is very tedious and tends to be a performance bottleneck as the size of the input file 41 grows.

The technique introduced here overcomes these problems, by breaking the merge phase down into sub-phases, where each sub-phase takes a predetermined number of subsets of a fingerprint file to merge and writes them back as a sorted, merged group. The number of threads used to process these groups can be a function of (e.g., equal to) the number of CPUs present in the system and can be dynamically tuned to achieve desired level of performance. One effect of this approach is to reduce the number of temporary files needed for the final merge phase. As a result, the amount of time needed to perform sorting in the deduplication process is reduced dramatically. This means that higher volume sizes can be supported with deduplication with little or no increase in the amount of available memory space needed for deduplication.

Figure 5:
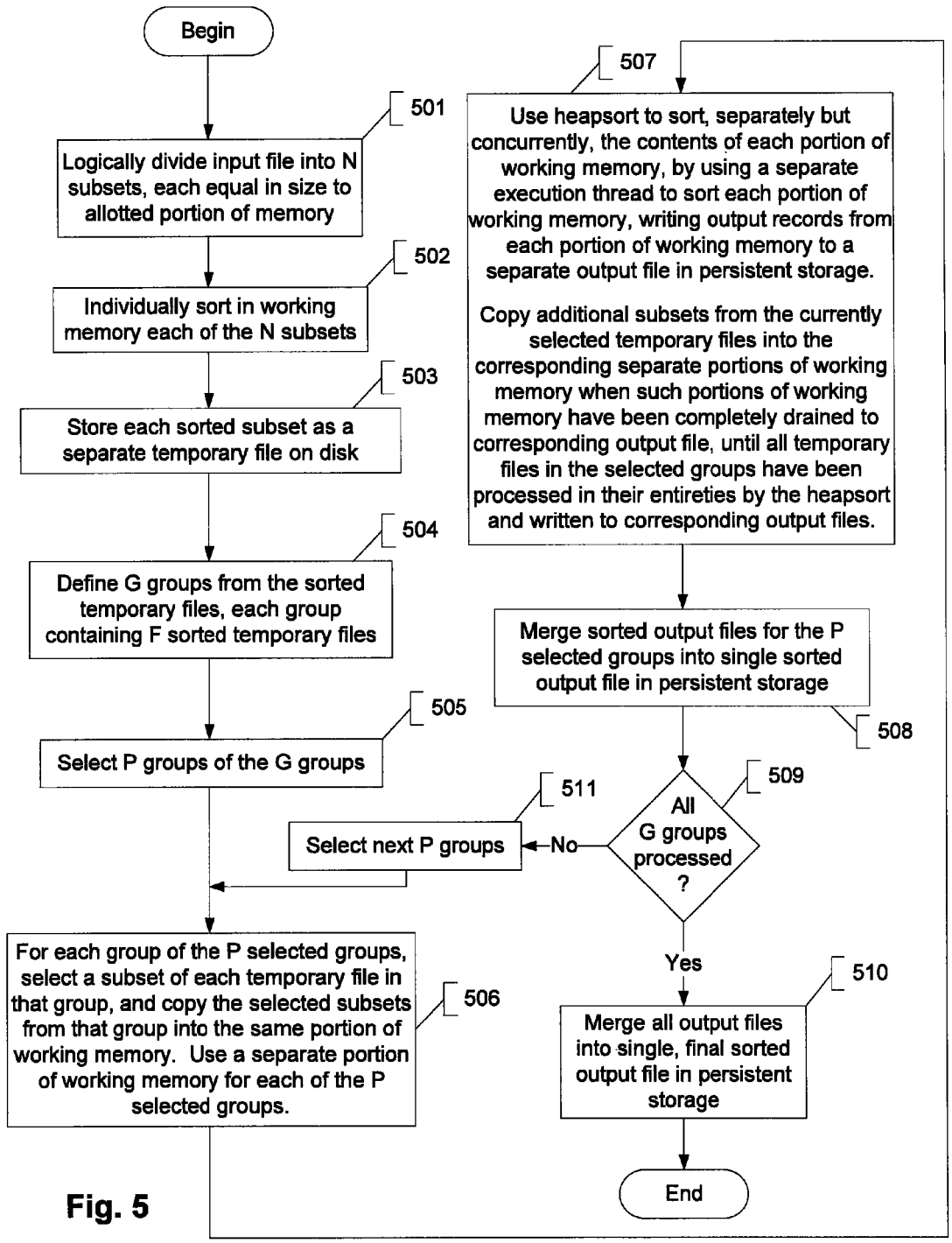
FIG. 5 is a flow diagram illustrating an example of a process for sorting a fingerprint file in a network storage system in accordance with the technique introduced here.
Figure 6A:
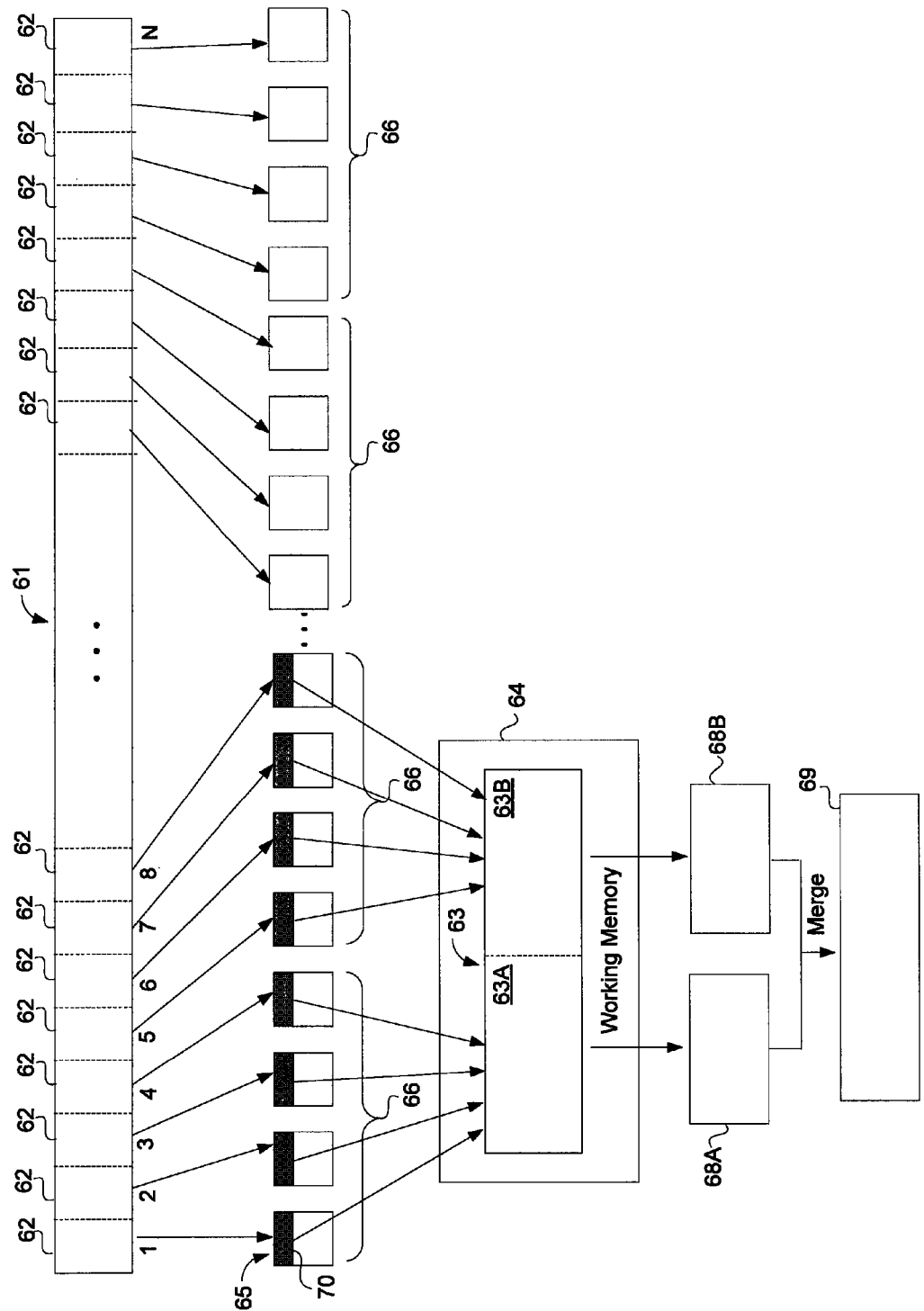
FIGS. 6A through 6C illustrate the process of FIG. 5 at different points in the process.
Figure 6B:
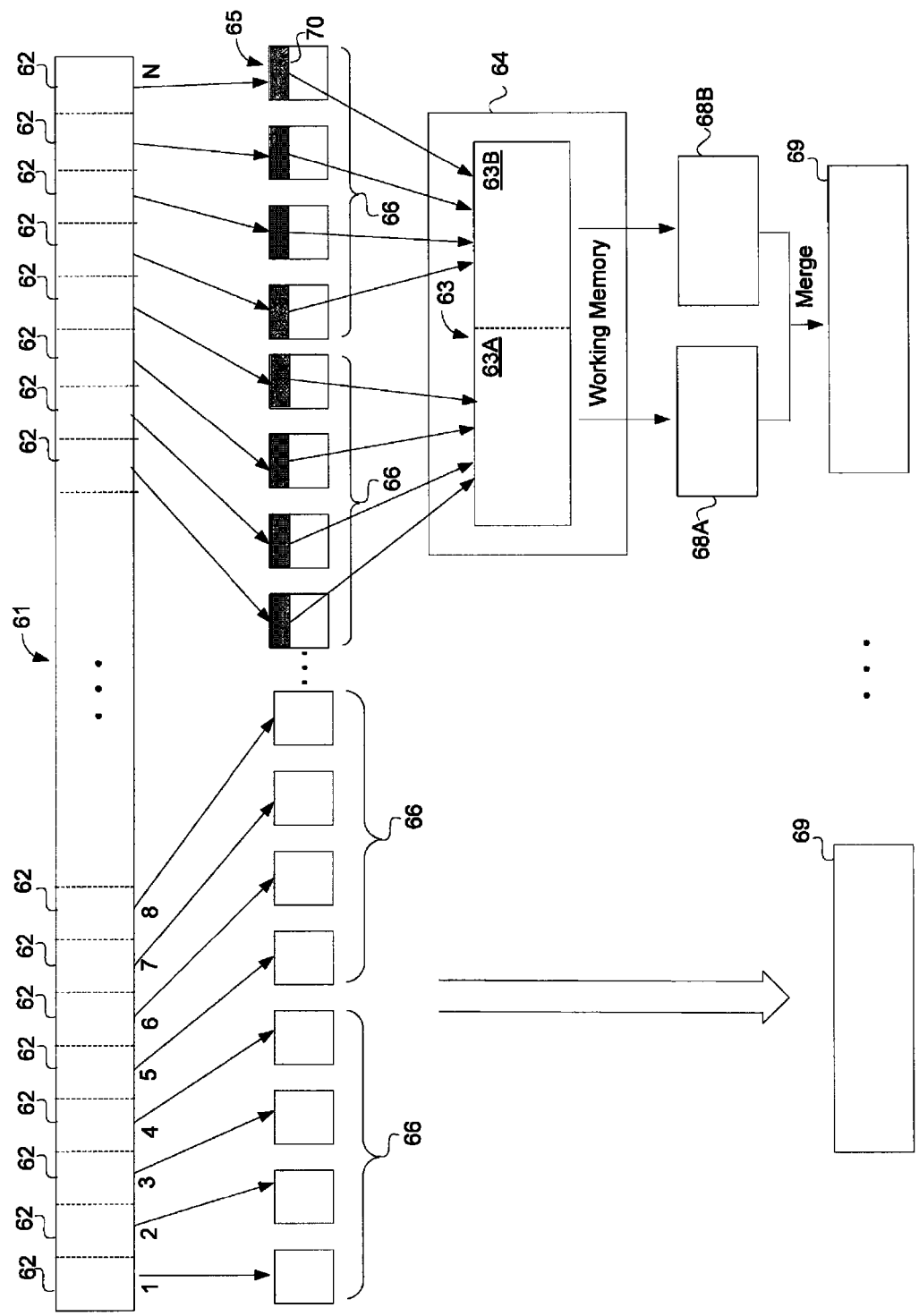
Figure 6C:
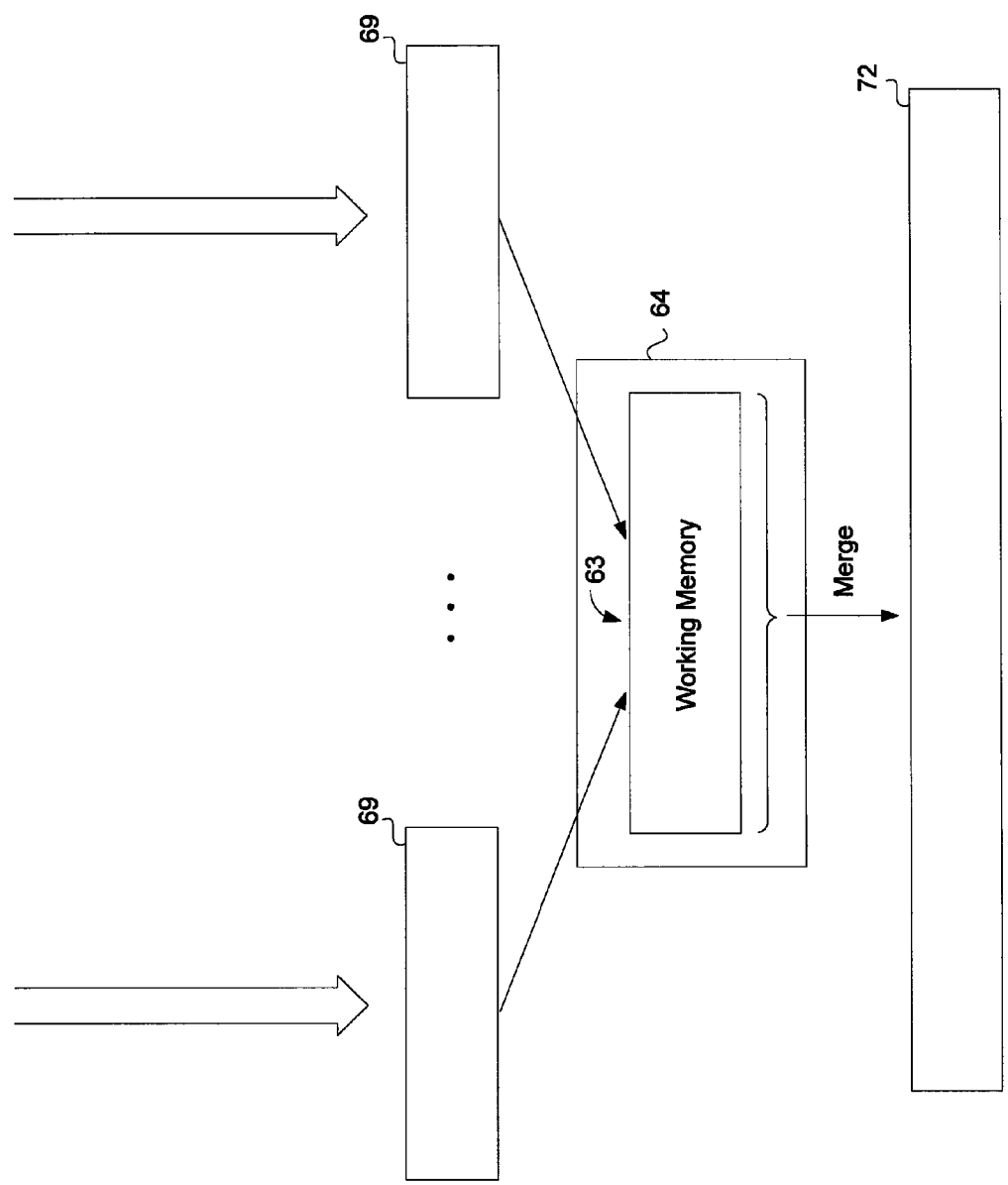

The technique introduced here, according to one embodiment, is illustrated in FIG. 5 and FIGS. 6A through 6C. In FIGS. 6A through 6C, the working memory 64 can represent memory 22 in FIG. 2. The process of FIGS. 5 and 6 can be performed by the deduplication engine 7 in FIG. 1. The input file 61 can represent a fingerprint file 8 in FIG. 1. Again, just for example, it can be assumed that only 8 MB of working memory 64 are made available for deduplication out of, for example, at least several GB of total working memory in the storage server, and that the input file 61 may be on the order of 256 GB, for example.

Initially, at 501 the method of FIGS. 5 and 6 logically divides a fingerprint file 61 (hereinafter "input file") into N contiguous subsets 62 of equal size, where N is an integer greater than one representing the number of subsets 62, such that the size of each subset 62 is equal to the amount of available memory space 63 in working memory 64 for deduplication. It is assumed that the amount of available memory space 63 for deduplication is much less than the total size of working memory 64 and is configured in advance, i.e., prior to initiating deduplication. Continuing the example introduced above, given a 256 GB input file, the input file 61 is divided into 32,768 contiguous subsets (N=32,768) of 8 MB each.

Next, at 502 the method individually sorts each of the N subsets 62 in working memory 63. In certain embodiments, the well-known quicksort algorithm is used to sort each subset 62. At 503 the method stores each of those sorted subsets 62 as a separate temporary file 65 in persistent storage (e.g., on disk, solid-state drives, flash, or the like). In FIG. 6, for example, the process creates N temporary files 65.

Next, at 504 the method defines some number, G, of groups 66 from the N sorted first temporary files 65, where G is an integer, greater than one and less than N, representing the total number of groups 66. Each group 66 contains some number, F, of temporary files 65, where F is an integer. In FIGS. 6A through 6C, to simplify illustration the value of F is illustrated as being four (4), but that is not necessarily the case in a real implementation. For example, in a real-world implementation the number F of temporary files 65 per group 66 can be a very large number, e.g., 1,024. In the illustrated embodiment, F=4, such that the number of groups G=N/F=N/4.

Next, at 505 the method selects some number, P, of groups 66 (i.e., selects P*F of the temporary files 65), where P typically is an integer less than G and is evenly divisible into G. P represents the number of groups 66 that will be processed concurrently in available memory 63. In one embodiment, P is equal to the number of CPUs available for the sorting process and is an integer multiple of two (2). In FIGS. 6A through 6C, to simplify illustration the value of P is illustrated as being two (2), but that is not necessarily the case in a real-world implementation.

At 506, for each group of the P selected groups 66, the method selects a subset 70 of each temporary file 65 in that group, and copies the selected subsets 70 from that group into the same portion 63A or 63B of available memory space 63. However, a separate portion 63A or 63B of available memory space 63 is used for each of the P selected groups 66. The selected subsets 70 are all of equal size, and that size is equal to the total amount of available working memory divided by P*F. If, for example, there is a total of 8 MB of available memory and there are eight (8) currently selected temporary files 65 (P*F=2*4=8), then the size of each selected subset 70 would be 8 MB/(2*4), i.e., 1 MB. Also, assuming for example each fingerprint record is 32 bytes, this means that each subset would include (1 MB/32 bytes-per fingerprint-record) fingerprint records, i.e., 32,768 fingerprint records.

Next, at 507 the method sorts, separately but concurrently, the contents of each partition 63A, 63B, of available memory space 63, using the heapsort algorithm, by using a separate execution thread to sort each partition 63A, 63B. This includes writing records from each partition 63A and 63B to a separate output file 68A and 68B, respectively, in persistent storage. More specifically, separately for each partition 63A and 63B, this step finds the lowest valued fingerprint at any given instant and writes that record to the corresponding output file 68A or 68B, respectively, and keeps repeating this operation until each of the partitions 63A, 63B has been completely "drained", i.e., until all of the partition's fingerprint entries have been written to the corresponding output file 68A or 68B.

When a given partition 63A or 63B has been completely drained, the process copies the next set of subsets 70 from the corresponding selected group 66 into that partition and continues sorting and writing to the corresponding output file 68A or 68B as just described, until all temporary files 65 in that group have been sorted in their entirety.

After all temporary files 65 in each currently selected group 66 have been sorted in their entirety and written to a corresponding output file 68A or 68B, then the process at 508 merges the output files 68A and 68B into a single sorted output file 69 for the P selected groups 66, in persistent storage. The process then continues in the same manner for the next P groups 66 of temporary files 65, until all of the G groups 66 (all of the N temporary files 65) have been processed in this manner (509, 511), as shown in FIG. 6B. This process results in G/P sorted output files 69 being generated. Finally, at 510 the process merges in available memory 63 all of the resulting output files 69 into a single, final, sorted output file 72 in persistent storage, as shown in FIG. 6C. The resulting output file 72 is the sorted version of the input file 61. Alternatively, the output files 69 can be merged into the final output file 72 as they are generated.

Note that this method has at least two advantages over the prior art method described above, assuming the same amount of available memory, same fingerprint record size, etc. First, note that the amount of time required to complete a heapsort increases almost exponentially with the number of entries (records) that need to be compared with each other in a given pass. Each heapsort execution thread in the method of FIGS. 5 and 6 compares fewer fingerprints in a given pass than the method of FIGS. 3 and 4, a result of which is that the heapsort phase can be completed much sooner. For example, in the prior art method described above, the heapsort algorithm compares 262,144 fingerprint records in a given pass (32,768 memory partitions*8 fingerprint records-per-partition=262, 144). In contrast, in the method of FIGS. 5 and 6, each heapsort execution thread compares only 128,000 fingerprint records in a given pass (4 MB per-partition/32 bytes-per-fingerprint-record=128,000 fingerprint records at a time).

Second, latency associated with reading temporary files from persistent storage can have a significant adverse impact on performance, particularly in a disk-based persistent storage subsystem. The method of FIGS. 5 and 6 provides more working memory for each temporary file 67 than the prior art method discussed above, which increases the number of fingerprints read from each temporary file at a time. This in turn reduces the frequency of reads from persistent storage compared to the prior art method, thereby reducing the overall latency associated with such reads. For example, in the prior art method described above, each partition 43A, 43B of working memory contains eight (8) fingerprints; when all eight fingerprints in a partition have been drained to the output file 47, the method has to read the next eight fingerprints from disk. In contrast, in the method of FIGS. 5 and 6, each partition 63A or 63B of working memory contains 128,000 fingerprints, resulting in less-frequent disk reads.

In a variation of the above described process of FIGS. 5 and 6, an additional separate thread executes, separately from the sorting threads, which coordinates between the sorting threads and performs in-memory merging of the output of the sorting threads. Specifically, rather than writing the contents of partitions 63A, 63B to separate output files 68A, 68B in persistent storage and then merging them, the method can instead write the contents of partitions 63A, 63B into temporary staging areas in working memory 64; and when those staging areas become full, the method can then merge them and write them as a single merged, sorted file back to persistent storage. This approach further reduces the number of reads from persistent storage.

Thus, an efficient and highly scalable technique of sorting an input file has been described. The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of sorting an input file, the method comprising:
    creating and sorting a plurality of temporary files, each temporary file including the contents of a different subset of a plurality of subsets of the input file;
    defining a plurality of groups from the plurality of temporary files, each group of the plurality of groups including all of the contents of two or more of the plurality of temporary files;
    selecting two or more of the groups;
    sorting concurrently, in memory of a processing system, the contents of each selected group, by using a separate execution thread of a plurality of execution threads to sort each selected group, where each execution thread sorts contents of an associated selected group stored within a separate portion of the memory; and
    merging sorted contents of the selected two or more groups into a single file.

2. A method as recited in claim 1, wherein said portion of said memory is smaller than the input file.

3. A method as recited in claim 1, wherein each said subset of the plurality of subsets is substantially equal in size to said portion of said memory.

4. A method as recited in claim 1, wherein the input file is a deduplication fingerprint database.

5. A method as recited in claim 1, wherein the processing system comprises a plurality of CPUs, and wherein the number of execution threads in said plurality of execution threads corresponds to the number of CPUs in said plurality of CPUs.

6. A method as recited in claim 1, wherein said sorting concurrently is done by heapsorting.

7. A method as recited in claim 1, wherein said defining a plurality of groups from the plurality of temporary files comprises defining each said group to include a predetermined number of consecutive temporary files of the plurality of temporary files.

8. A method as recited in claim 7, wherein said selecting two or more groups comprises selecting two or more consecutive groups of the plurality of groups.

9. A method as recited in claim 1, further comprising using an additional execution thread to coordinate between the plurality of execution threads to merge outputs of the plurality of execution threads in said memory and to write the merged outputs to a single output file.

10. A method of sorting an input file in a processing system by using only a limited amount of memory, the method comprising:
    logically dividing the input file into a plurality of subsets, wherein the input file is larger than said limited amount of memory;
    creating a plurality of temporary files in persistent storage, each temporary file including a different subset of the plurality of subsets of the input file;
    sorting individually, in said memory, each of the plurality of temporary files;
    defining a plurality of groups from the sorted plurality of temporary files, wherein each group includes all of the contents of two or more of the plurality of temporary files;
    selecting two or more groups of the plurality of groups and sorting concurrently, in said memory, the contents of each selected group, by using only a portion of said memory which is smaller than the input file, and by using a separate execution thread to sort each selected group, where each execution thread sorts contents of an associated selected group stored within a separate portion of said memory;
    performing said selecting and sorting for remaining groups of the plurality of groups until the contents of all of the plurality of temporary files have been sorted; and
    merging sorted contents of the plurality of temporary files into a single file.

11. A method as recited in claim 10, wherein the processing system comprises a plurality of CPUs, and wherein the number of execution threads in said plurality of execution threads corresponds to the number of CPUs in said plurality of CPUs.

12. A method as recited in claim 11, further comprising using an additional execution thread to coordinate between the plurality of execution threads to merge outputs of the plurality of execution threads in said memory and to write the merged outputs to a single output file.

13. A method as recited in claim 10, wherein the input file is a deduplication fingerprint database.

14. A method as recited in claim 10, wherein said sorting concurrently is done by heapsorting.

15. A method of sorting a deduplication fingerprint database for use in deduplication in a network storage server, the method comprising:
    logically dividing the deduplication fingerprint database into a plurality of subsets in the network storage server, each said subset being substantially equal in size to an available amount of memory of the network storage server;
    creating a plurality of temporary files in persistent storage, each temporary file including a different subset of the plurality of subsets of the deduplication fingerprint database;
    sorting individually, in said memory of the network storage server, each of the plurality of temporary files;
    defining a plurality of groups from the sorted plurality of temporary files, wherein each said group includes all of the contents of two or more of the plurality of temporary files;

selecting two or more of the groups and sorting concurrently, in said memory of the network storage server, contents of each selected group, by using an amount of said memory which is smaller than the input file, and by using a separate execution thread to sort each selected group, where each execution thread sorts contents of an associated selected group stored within a separate portion of said memory;

performing said selecting and sorting for remaining groups of the plurality of groups until the contents of all of the plurality of temporary files have been sorted; and merging sorted contents of the plurality of temporary files into a single file.

16. A method as recited in claim 15, wherein the network storage server has a plurality of CPUs, and wherein the number of execution threads in said plurality of execution threads corresponds to the number of CPUs in said plurality of CPUs.

17. A method as recited in claim 16, further comprising using an additional execution thread to coordinate between the plurality of execution threads to merge outputs of the plurality of execution threads in said memory and to write the merged outputs to a single output file.

18. A method as recited in claim 15, wherein said sorting concurrently is done by heapsorting.

19. A network storage server comprising:
a network adapter through which to receive data access requests from a storage client via a network;
a storage adapter through which to access a persistent data storage subsystem;
a memory; and
a processor coupled to the network adapter, the storage adapter and the memory, and configured to perform operations which include:
logically dividing an input file into a plurality of subsets;
creating and sorting a plurality of temporary files, each temporary file including the contents of a different subset of the plurality of subsets of the input file;
defining a plurality of groups from the plurality of temporary files, wherein each group includes contents of two or more of the plurality of temporary files;
selecting two or more groups of the plurality of groups and sorting concurrently, in the memory, the contents of each selected group, by using only a portion of the memory which is smaller than the input file and by using a separate execution thread of a plurality of execution threads for each selected group, where each execution thread sorts contents of an associated selected group stored within a separate portion of the memory; and
merging sorted contents of the sorted plurality of temporary files into a single file.

20. A network storage server as recited in claim 19, wherein each said subset of the plurality of subsets is substantially equal in size to said portion of said memory.

21. A network storage server as recited in claim 19, wherein the input file is a deduplication fingerprint database.

22. A network storage server as recited in claim 19, wherein the network storage server comprises a plurality of CPUs, and wherein the number of execution threads in said plurality of execution threads corresponds to the number of CPUs in said plurality of CPUs.

23. A network storage server as recited in claim 19, wherein said sorting concurrently is done by heapsorting.

24. A network storage server as recited in claim 19, wherein:
the network storage server comprises a plurality of CPUs, and the number of execution threads in said plurality of execution threads corresponds to the number of CPUs in said plurality of CPUs.

25. A network storage server as recited in claim 24, further comprising an additional execution thread to coordinate between the plurality of execution threads to merge outputs of the plurality of execution threads in said memory and to write the merged outputs to a single output file.

26. A storage system comprising:
a storage operating system configured to maintain data in a persistent storage subsystem and to enable a user to access the data; and
a deduplication engine configured to deduplicate the data, wherein deduplicating the data includes
logically dividing an input file into a plurality of subsets, wherein the input file contains a plurality of deduplication fingerprints;
creating and sorting a plurality of temporary files, each temporary file including the contents of a different subset of the plurality of subsets of the input file;
defining a plurality of groups from the plurality of temporary files, wherein each group includes all of the contents of two or more temporary files of the plurality of temporary files;
selecting two or more groups of the plurality of groups and sorting concurrently, in the memory, the contents of each selected group, by using a separate execution thread to sort each selected group, where each execution thread sorts contents of an associated selected group stored within a separate portion of the memory; and
merging sorted contents of the sorted plurality of temporary files into a single file.

27. A storage system as recited in claim 26, wherein each said subset of the plurality of subsets is substantially equal in size to said portion of said memory.

28. A storage system as recited in claim 26, further comprising a plurality of CPUs, wherein the number of execution threads in said plurality of execution threads corresponds to the number of CPUs in said plurality of CPUs.

29. A storage system as recited in claim 28, further comprising an additional execution thread to coordinate between the plurality of execution threads to merge outputs of the plurality of execution threads in said memory and to write the merged outputs to a single output file.

30. A storage system as recited in claim 26, wherein the input file is a deduplication fingerprint database.

31. A storage system as recited in claim 26, wherein said sorting concurrently is done by heapsorting.

32. An apparatus comprising:
means for creating and sorting a plurality of temporary files, each temporary file including the contents of a different subset of a plurality of subsets of an input file;
means for defining a plurality of groups from the plurality of temporary files, each group including all of the contents of two or more temporary files of the plurality of temporary files;
means for selecting two or more groups of the plurality of groups;
means for sorting concurrently, in memory of a processing system, the contents of each selected group, by using a separate execution thread to sort each selected group, where each execution thread sorts contents of an associated selected group stored within a separate portion of said memory; and
means for merging sorted contents of the selected two or more files into a single file.

* * * * *